Patented Nov. 27, 1923.

1,475,492

UNITED STATES PATENT OFFICE.

HERBERT J. KRASE, OF CLARENDON, VIRGINIA, AND JEW YAM YEE, OF WASHINGTON, DISTRICT OF COLUMBIA.

HYDRATED CALCIUM NITRATE AND METHOD OF MAKING SAME.

No Drawing.  Application filed June 28, 1921. Serial No. 481,056.

*To all whom it may concern:*

Be it known that we, HERBERT J. KRASE and JEW YAM YEE, citizens of the United States, and residents of Clarendon, county of Arlington and State of Virginia, and Washington, District of Columbia, respectively, have invented an Improvement in Hydrated Calcium Nitrate and Methods of Making Same, of which the following is a specification.

The subject of this invention is granular calcium nitrate and method of making same.

The main object of this invention is the production of calcium nitrate of sufficiently low hygroscopicity to permit of its practical use as a fertilizer or fertilizing ingredient.

Calcium nitrate is easily manufactured by the action of nitric acid on marble, limestone or any other suitable compound of calcium, and the solution of calcium nitrate thus obtained is evaported until the compound corresponding to the composition expressed by the formular $Ca(NO_3)_2.4H_2O$ is obtained. This composition can be readily determined by the boiling point of the solution or any other suitable method of analysis. The substance $Ca(NO_3)_2.4H_2O$ which melts at 42.7° C. is obtained by allowing the concentrated solution to cool below its melting point, whereupon the solution solidifies to a very hard cake. Calcium nitrate in this form is unsuited for fertilizer use, first because the solidified cake must be pulverized and secondly because the calcium nitrate is very hygroscopic and can therefore neither be advantageously mixed with other materials, nor stored except in special containers, which materially increases the cost of handling. We have discovered that these two difficulties can be overcome by the process which forms the basis of the present invention.

The product which is obtained by the practice of our invention is a granular non-hygroscopic substance with a relatively low rate of solution and because of these properties is suited for use as top dressing or for mixing with other fertilizer materials.

The practice of our invention may be described as follows:

The calcium nitrate, which has been previously obtained by the treatment of limestone, marble, or any other suitable compound of calcium, with nitric acid or other suitable oxides of nitrogen in the presence of water, is concentrated by evaporation until the liquor contains approximately 30.5% water or the solution corresponds in composition to the salt $Ca(NO_3)_2.4H_2O$. This concentrated liquor in then allowed to run by any suitable means into a grainer such as is used in the manufacture of grained ammonium nitrate. After the molten salt has been introduced into the grainer, the rotating stirrers are started and kept rotating until the batch is grained. The grain formation in calcium nitrate begins at about the freezing temperature of the solution at which point the mass becomes viscous. The viscosity gradually increases as the mass cools and the mass finally collects in large lumpy aggregates which gradually break up into small well rounded grains. We have found that the size of the grains produced can be controlled by the rate of cooling through the freezing point, the more rapid the cooling the smaller the grain and, conversely, the slower the cooling the larger the grain. By this means we are able to obtain the optimum size of grain for use in fertilizer.

The grained calcium nitrate as above prepared would be an excellent fertilizer material if it were not for its great hygroscopicity. To overcome this difficulty our procedure is as follows:

When the grained calcium nitrate reaches a temperature between 35° and 40° C. the molten coating material is poured over the grains, stirring all the while to insure uniformity of coating. For the coating material we prefer to use a mixture of paraffin and petrolatum in the proportions of 25 parts of paraffin to 75 parts of petrolatum but other similar material or vegetable oils or waxes may be used without departing from the spirit of the invention.

The coating material is added in the proportions of 1 to 4 parts of coating material for 99 to 96 parts of calcium nitrate. Stirring after an addition of the coating material is continued for 15 to 30 minutes when the coated calcium nitrate is discharged from the grainer.

Having described our invention what we claim and desire to secure by Letters Patent is:

1. The method of making calcium nitrate, including preparing a concentrated solution of calcium nitrate containing approximately 30.5% water, placing the solution in a grainer and stirring while cooling slowly through the freezing point of the solution and continuing the stirring until the lumpy aggregates formed are reduced to rounded grains.

2. The method of making calcium nitrate, including preparing a concentrated solution of calcium nitrate, placing the solution in a grainer, and stirring while cooling through the freezing point of the solution, and continuing the stirring until all the calcium nitrate separated out is reduced to grains having smooth curved surfaces.

3. The method of producing calcium nitrate, including preparing a concentrated solution of calcium nitrate, placing the solution in a grainer, stirring while cooling through the freezing point of the solution, continuing stirring until the lumpy aggregates formed are reduced to rounded grains, introducing a moisture excluding coating substance into the grainer while stirring and continuing the stirring from 15 to 30 minutes.

4. The method of producing calcium nitrate, including preparing a concentrated solution of calcium nitrate, placing the solution in a grainer, stirring while cooling through the freezing point of the solution and continuing the stirring until the lumpy aggregates formed are reduced to rounded grains, introducing into the grainer, when the material therein has been reduced to a temperature between 35° and 40° C., a moisture excluding coating substance and continuing the stirring until the grains are completely coated.

HERBERT J. KRASE.
JEW YAM YEE.